US006437997B1

(12) United States Patent
Inarida et al.

(10) Patent No.: US 6,437,997 B1
(45) Date of Patent: *Aug. 20, 2002

(54) CONTROL DEVICE FOR ELECTRIC POWER TRANSLATING DEVICE

(75) Inventors: Satoru Inarida; Tokunosuke Tanamachi, both of Hitachinaka; Kiyoshi Nakata, Iwase-machi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/941,569

(22) Filed: Aug. 30, 2001

Related U.S. Application Data

(63) Continuation of application No. 09/445,212, filed as application No. PCT/JP98/04692 on Oct. 16, 1998, now Pat. No. 6,307,759.

(30) Foreign Application Priority Data

Oct. 31, 1997 (JP) ............................................. 9-299915

(51) Int. Cl.[7] ...................... H02M 5/458; H02M 1/12; H02M 1/14
(52) U.S. Cl. ........................... 363/37; 363/40; 363/46; 363/98
(58) Field of Search ........................... 363/37, 40, 46, 363/98

(56) References Cited

U.S. PATENT DOCUMENTS

| 4,246,528 A | 1/1981 | Nakajima | 318/721 |
| 4,978,894 A | 12/1990 | Takahara | 318/768 |
| 5,250,800 A | 10/1993 | Tanamachi et al. | 318/811 |
| 5,289,364 A | 2/1994 | Sakurai | 363/147 |
| 5,504,667 A | 4/1996 | Tanaka et al. | 363/37 |
| 5,532,569 A | 7/1996 | Tanamachi et al. | 318/811 |
| 5,680,299 A | 10/1997 | Yasuda et al. | 363/41 |

FOREIGN PATENT DOCUMENTS

| JP | 49133826 | 12/1974 |
| JP | 177492 | 3/1989 |
| JP | 583976 | 4/1993 |
| JP | 5308792 | 11/1993 |
| JP | 6233587 | 8/1994 |
| JP | 8205547 | 8/1996 |
| JP | 9215398 | 8/1997 |
| JP | 10201242 | 7/1998 |

*Primary Examiner*—Bao Q. Vu
(74) *Attorney, Agent, or Firm*—Antonelli, Terry, Stout & Kraus, LLP

(57) ABSTRACT

An electric power translating device employs a converter for converting an AC source voltage into a DC voltage, a smoothing capacitor connected at the DC side of the converter, an inverter for inverting the DC from the smoothing capacitor into an AC and for supplying the AC to an AC motor and means for controlling the voltage, frequency or phase in the AC output from the inverter. The device further includes means for regulating at least one of voltage, frequency and phase in the AC output of the inverter based on a ripple frequency component contained in the AC output of the inverter and associated with the rectification by the converter. Whereby, beat phenomenon caused by rectification ripple is suppressed.

32 Claims, 12 Drawing Sheets

CONTROL DEVICE FOR ELECTRIC POWER TRANSLATING DEVICE

This is a continuation of parent application Ser. No. 09/445,212, filed Dec. 6, 1999, allowed now U.S. Pat. No. 6,307,759, which is a 371 of PCT/JP98/04692 filed Oct. 16, 1998.

The present invention relates to a control unit for an electrical power translating device which is constituted by a converter which is used for converting AC to DC and an inverter for inverting DC to AC; more specifically, the invention relates to a technical measure which is suitable for suppressing a beat phenomenon associated with rectification ripples due to rectification by a converter when an AC motor is driven at variable speeds by an inverter.

In an electrical power translating device of a converter-inverter having an intermediate DC stage, when an AC power source for the converter is, in particular, a single phase source (for example, as in an electric rolling stock for an electric railway in which power is fed from an AC trolley line), a ripple frequency component having a frequency twice the frequency of the AC power source is contained in the converted DC voltage due to the rectification. Although, such a ripple frequency component can be reduced if the capacity of a smoothing capacitor to be provided at the DC stage is increased, however, it is difficult to remove the ripple component completely; moreover, with the increase of the capacity of the smoothing capacitor, the size thereof increases, which prevents a reduction of the size and weight of the concerned device.

When the resultant DC voltage containing the above ripple component is inverted by the inverter into a variable frequency variable voltage AC and the inverted AC is supplied to a load, such as an AC motor, the difference and sum components of the above ripple frequency and the inverter operating frequency other than the inverter operating frequency component are contained in the inverter output voltage and the motor current. Among these frequency components, when the operating frequency and the ripple frequency come near each other, the above difference component constitutes a low frequency component, since the impedance in the motor is small in relation to low frequencies. With the low frequency component, a large ripple current flows through the motor, and a beat phenomenon is caused in which the torque generated by the motor ripples.

For example, JA-A-64-77492 discloses the principle as to how the beat phenomenon is caused and a method of suppressing the same. In the beat phenomenon suppressing method disclosed in this patent document, the degree of ripple in the DC input voltage of an inverter is detected, the degree of ripple in frequency for the ripple degree in the DC input voltage is determined with a compensation gain and a compensation phase difference corresponding to an operating frequency, and the inverter frequency is regulated depending on the ripple degree in frequency, whereby the beat phenomenon is suppressed.

However, in the beat phenomenon suppressing method disclosed in the above-mentioned patent document, in order to achieve a high beat phenomenon suppressing effect, it is necessary to regulate the compensation gain and the compensation phase difference depending on the inverter operating frequency. Further, in order to suppress the beat phenomenon always to an optimum condition, it is necessary to take into account a variation of the motor output other than the inverter operating frequency. However, if it is required to regulate the compensation gain and the compensation phase difference by taking into account the inverter operating frequency and the motor output, problems of control complexity and troubles in practice arise.

Further, as disclosed, for example, in JP-A-5-83976, a vector control for an inverter has been recently used in a control unit for an induction motor for driving an electric rolling stock, however, no disclosures in the patent document are found for suppressing the above beat phenomenon by taking advantage of the vector control. Further, the present inventors are aware no other documents relating to suppression of the beat phenomenon.

An object of the present invention is to provide an electric power translating device and a control method therefor which can suppress the beat phenomenon caused by the ripple component contained in the inverter DC input voltage, even if the operating frequency of the inverter and the motor output vary, without necessitating complex gain and phase difference regulations.

SUMMARY OF THE INVENTION

The present invention is achieved in an electric power translating device which comprises a converter for converting an AC source voltage into a DC voltage by rectifying the AC source voltage, a smoothing capacitor connected at the DC side of the converter, an inverter for inverting the DC obtained from the smoothing capacitor into an AC and for supplying the AC to an AC motor and means for controlling the voltage, frequency or phase in the AC output from the inverter, by provision of means for regulating at least one of voltage, frequency and phase in the AC output of the inverter based on a ripple frequency component contained in the AC output of the inverter associated with the rectification by the converter.

Further, the present invention is achieved in a control method of an inverter which inverts a DC voltage, formed by rectifying an AC voltage using a converter, into an AC and then supplies the AC to an AC motor by controlling the voltage, frequency or phase in the AC output of the inverter to perform a variable speed control for the AC motor, by regulating at least one of voltage, frequency and phase in the AC output of the inverter based on a ripple frequency component contained in the AC output of the inverter associated with the rectification by the converter in the direction of suppressing a beat phenomenon caused by a rectification ripple.

PREFERRED EMBODIMENTS FOR CARRYING OUT THE INVENTION

Figure 1:
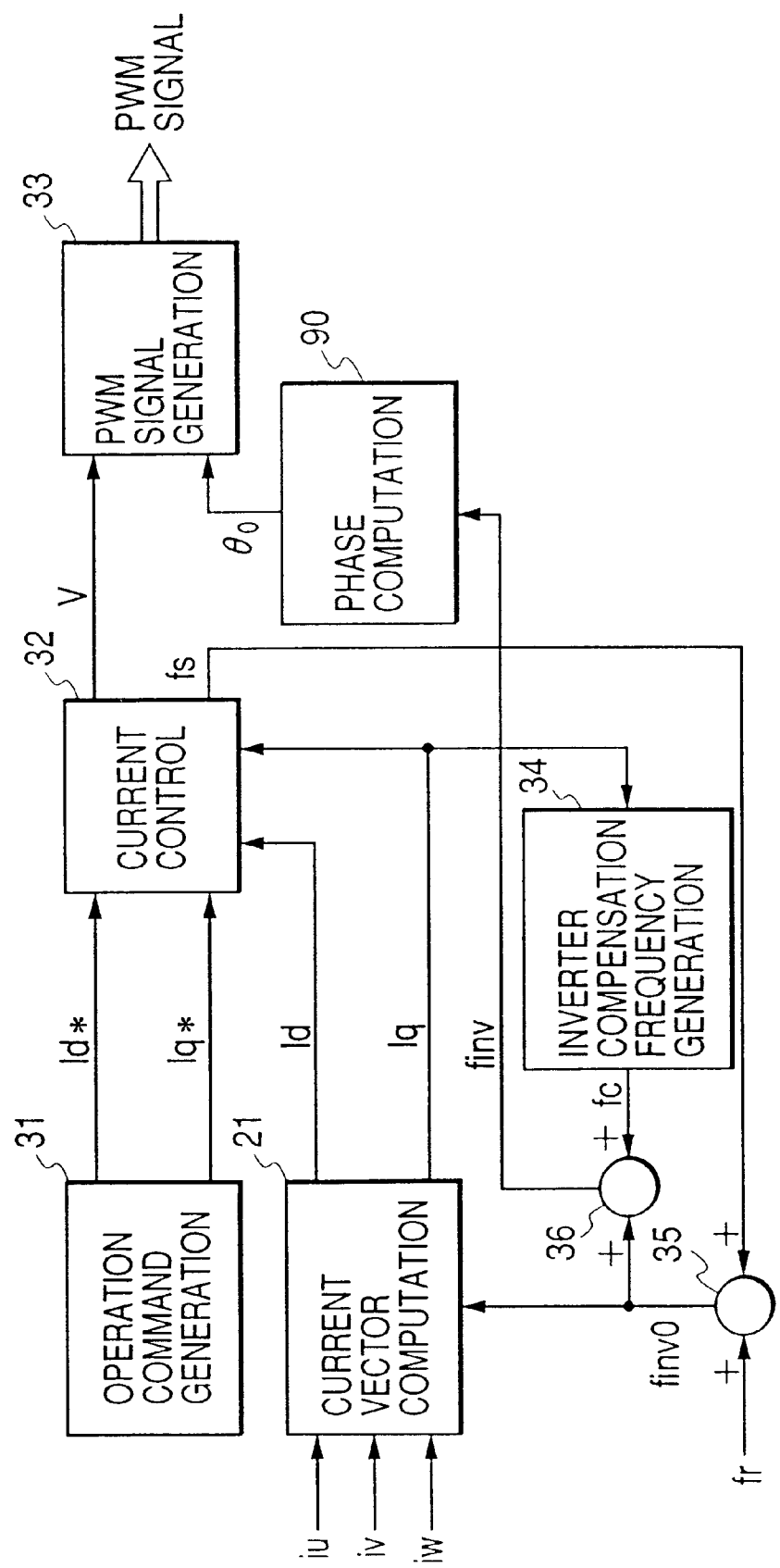
FIG. 1 is a functional block diagram of a control unit for an electric power translating device representing one embodiment according to the present invention.
Figure 2:
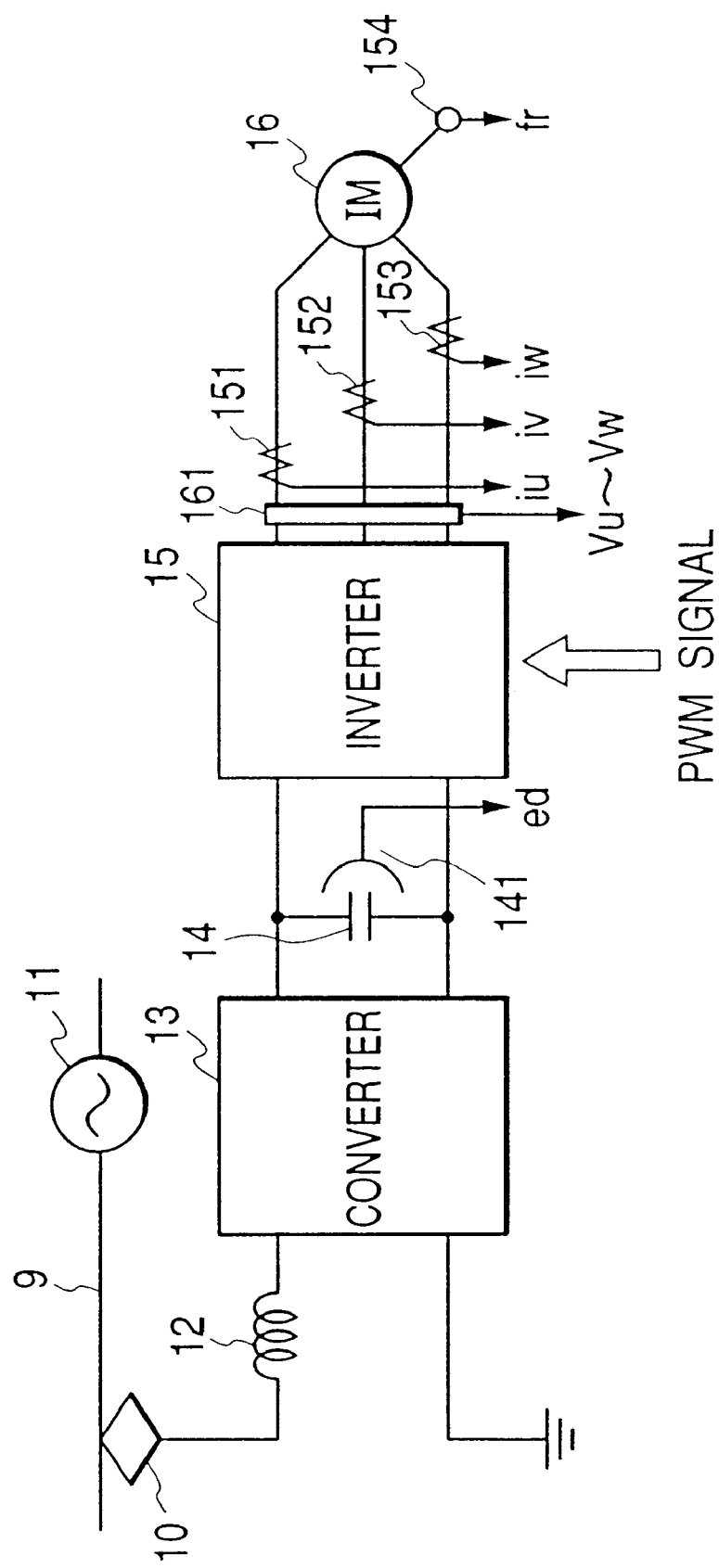
FIG. 2 is a main circuit diagram of an electric power translating device showing the embodiment of the present invention being applied to an electric stock for an electric railway.

Hereinbelow, various embodiments of the present invention will be explained. FIG. 1 shows a functional block diagram of a control unit for controlling an inverter within the electric power translating device shown in FIG. 2. FIG. 2 shows a main circuit diagram of an electrical power translating device in an electric railway. At first, FIG. 2 will be explained. The main circuit is constituted by a converter 13 which rectifies and converts an input from a single phase AC source 11 fed via a trolley line 9, a pantograph 10 and a reactor 12; a smoothing capacitor 14, which is connected at the DC side of the converter 13 and smooths the DC voltage rectified by the converter 13; and an inverter which receives the DC voltage ed smoothed by the smoothing capacitor 14 as an input voltage and supplies an AC of variable frequency and variable voltage to a three phase AC motor (herein an induction motor is illustrated) 16. Further, in the drawing a variety of detectors used for the control unit are provided which will be explained later, namely, a voltage detector 141 which detects the voltage ed of the smoothing capacitor 14, current detectors 151 through 153 which detect three phase output currents (respective U through W phase currents iu through iw) from the inverter 15 to the AC motor 16, voltage detector 161 which detects three phase output voltages (Vu through Vw) of the inverter 15 and a speed detector 154 which detects a rotating frequency fr of the AC motor 16.

The operation of the control unit in FIG. 1 is based on the vector control method disclosed in JP-A-5-83976. Numeral 31 identifies an operation command generating means which generates an exciting current command Id* and a torque current command Iq* representing current components of two orthogonal axes in a rotary coordinate system of the AC motor to be driven. Numeral 21 identifies a current vector computing means which performs a coordinate conversion on detected instantaneous output currents iu, iv and w of respective phases of the inverter in the rotary coordinate system with the fundamental inverter frequency finv0 according to formula (2), which will be explained later, decomposes it into the current components of two orthogonal axes and computes an exciting current component Id and a torque current component Iq in vector. Numeral 32 denotes a current control means which computes respective commands for an output voltage (effective value) V of the inverter and a slip frequency fs so that the components Id and Iq coincide with the respective commands Id* and Iq*. Numeral 34 denotes an inverter compensation frequency generating means which generates an inverter compensation frequency fc based on the computed torque current component Iq. Numerals 35 and 36 identify adders. The adder 35 adds the rotating frequency fr and the slip frequency fs of the AC motor to compute the inverter fundamental frequency finv0, and the adder 36 adds the inverter fundamental frequency finv0 and the inverter compensation frequency fc to compute a command of inverter operating frequency finv. Numeral 90 denotes a phase computing means which computes a phase command θ0 (=2πfinvt, wherein t is time) for the inverter output voltage based on the inverter operating frequency finv. Numeral 33 identifies a PWM pulse generating means which performs a well known pulse width modulation control based on the inverter output voltage command V and the inverter phase command θo and generates PWM signals. With the PWM signals the inverter 15 is operated.

Herein, the characterizing portion of the present invention resides in the combined constitution of the inverter compensation frequency generating means 34 and the adder 36, which have been added to the basic constitution of a conventional vector control unit.

Before starting a detailed explanation of the present invention in relation to the above control constitution, a principle of the present invention will be explained.

In vector control, the exciting current and the torque current are controlled independently. At first, a method, which is well known, of decomposing respective instantaneous phase currents iu, iv and iw of a three phase AC motor into the above two vector components will be explained.

Formula (1) below represents the instantaneous phase currents of a three phase AC motor when no beats are generated (fc=0 and finv=finv0), wherein IM is an effective value of the motor current, t is time and φ is a power factor angle of the motor current.

$$iu = \sqrt{2}\, IM \sin(\pi finv0\, t - \phi) \quad (1)$$
$$iv = \sqrt{2}\, IM \sin\left(s\pi fin0\, t - \frac{2}{3}\pi\right)$$
$$iw = \sqrt{2}\, IM \sin\left(2\pi fin0\, t - \theta + \frac{2}{3}\pi\right)$$

Formula (2) below represents when the above instantaneous three phase currents are coordinate converted into two orthogonal d-q axes components (Id, Iq) in a rotary coordinate system rotating with a phase of 2πfinv0. Wherein δ is a phase difference between an inverter output voltage vector and a torque current component $$\begin{bmatrix} Id \\ Iq \end{bmatrix} = \frac{\sqrt{2}}{3} \begin{bmatrix} -\cos(2\pi fin0t - \delta) & -\cos(2\pi fin02 - \frac{2}{3}\pi - \delta) & -\cos\left(2\pi fin0t + \frac{2}{3}\pi - \delta\right) \\ \sin(2\pi fin0t - \delta) & \sin\left(2\pi fin0t - \frac{2}{3}\pi - \delta\right) & \sin\left(2\pi fin0t + \frac{2}{3}\pi - \delta\right) \end{bmatrix} \begin{bmatrix} iu \\ iv \\ iw \end{bmatrix} \quad (2)$$

Id and Iq obtained as a result of the computation according to the above formula (2) represent magnitudes of the exciting current vector and the torque current vector for the component of finv0 and the following results are obtained:

$$Id = -IM \cdot \sin(\phi - \delta)$$

and $$Iq = IM \cdot \cos(\phi - \delta).$$

Now, an instance when a ripple voltage of a frequency f0 is superposed on the output voltage of the inverter input will be explained. In the inverter AC output voltage, other than the component of the inverter fundamental frequency finv0, frequency components representing a summed frequency component finv0+f0 of the inverter fundamental frequency finv0 and the DC voltage ripple frequency f0 and a difference frequency component finv0+f0 thereof are generated. In view of the fact that, the lower the frequency is, the lower will be the impedance that the motor assumes, the main factor causing the beat phenomenon is the frequency component of finv0−f0. Accordingly, the motor current containing the ripple frequency component can be expressed as follows by making use of finv0 and finv0−f0. Wherein IM is an effective current value for the finv0 component and IB is an effective current value for the finv0−f0 component.

$$iu = \sqrt{2} \, IM \, \sin(2\pi finv0t - \phi) + \quad (3)$$
$$\sqrt{2} \, IB \, \sin(-2\pi finv0 - f0)t + \theta0 - \phi0)$$

$$iv = \sqrt{2} \, IM \, \sin\left(2\pi finv0t - \phi - \frac{2}{3}\pi\right) +$$
$$\sqrt{2} \, IB \, \sin\left(-2\pi(finv0 - f0)t + \frac{2}{3}\pi + \theta0 - \phi0\right)$$

$$iw = \sqrt{2} \, IM \, \sin\left(2\pi fin0t - \phi + \frac{2}{3}\pi\right) -$$
$$\sqrt{2} \, IB \, \sin\left(-2\pi(finv0 - f0)t - \frac{2}{3}\pi + \theta0 - \phi0\right)$$

Wherein, $\theta_0$ is a phase of the DC voltage ripple component and $\phi_0$ is a motor power factor angle with respect to the frequency component for finv0−f0.

Formula (4) below represents when the instantaneous three phase currents expressed by the above formula (3) are coordinate-converted into two orthogonal d-q axes components (Id, Iq) in a rotary coordinate system rotating with a phase of 2πfinv0.

$$Id = -IM \sin((\phi-\delta)+IB \cos(2\pi f0t-\theta0-\phi0-\delta)$$

$$Iq = IM \cos(\phi-\delta)+IB \sin(2\pi f0t-\theta0-\phi0-\delta) \quad (4)$$

From the above formulas (4), it will be appreciated that in both Id and Iq, in addition to IM·sin(ϕ−δ) and IM−cos (ϕ−δ) representing, respectively, the vector magnitudes of the exciting current and the torque current for the finv0 component, d and q axis current components for the frequency component f0 are respectively contained.

Namely, through the detection of the motor current after converting into a rotary coordinate system as Id and Iq, the fundamental wave current component appears as a DC signal, therefore, a ripple frequency component which is superposed on the DC signal can be easily taken out.

In accordance with the present invention, a current component of f0 is taken out from at least one of Id and Iq which are obtained by converting the detected three phase motor currents into a rotary coordinate system, and the operating frequency (output frequency) finv of the inverter is controlled in a direction for reducing the taken out current component of f0, whereby the phenomenon of beating the motor current at the frequency of finv0−f0 is suppressed.

The constitution of the characterizing portions of the present invention in FIG. 1 based on the above explained principle will be explained. In the inverter compensation frequency generating means 34, a f0 frequency component is extracted from the torque current Iq obtained from the current vector computing means 21, and based on the extracted f0 frequency component, a compensation frequency fc is computed. Then the compensation frequency fc is added to an inverter fundamental frequency finv0 to produce an inverter output frequency (operating frequency) finv, and the inverter is controlled based on the inverter output frequency. As a result, a feed back system for the ripple frequency component contained in the motor currents is formed. Thus, regardless of any of the operation conditions, the beat phenomenon can always be suppressed. Further, in the present embodiment, the feed back system is formed by making use of Iq, however, since the f0 frequency component can be detected in Id, a feed back system which makes use of Id can also be formed.

Further, since the beat phenomenon is caused when the operating frequency of the inverter passes through the ripple frequency, it is sufficient if the addition of the compensation frequency fc to the inverter fundamental frequency finv0 is performed only in a band near the ripple frequency.

Figure 3:
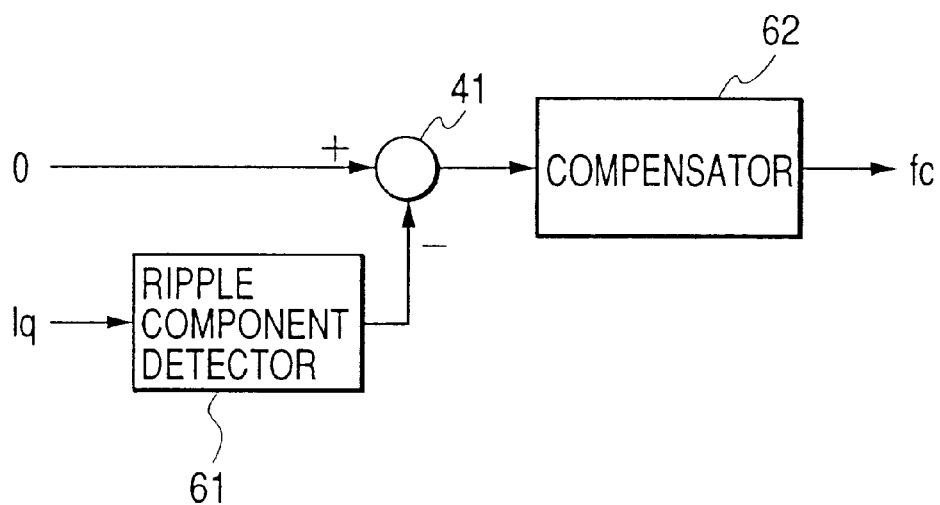
FIG. 3 is a block diagram of a characterizing portion of the present invention for use in the embodiment of FIG. 1.

FIG. 3 shows an example of the detailed constitution of the inverter compensation frequency generating means 34 in FIG. 1. In the FIG. 3 embodiment, after detecting a component of frequency f0 contained in the torque current component Iq by a ripple component detector 61, the output of the ripple component detector 61 is subtracted from a target value 0 in a subtracter 41 and the output of the subtracter 41 is inputted to the compensator 62. The compensator 62 generates an inverter compensation frequency fc so that the input thereof assumes zero, namely the ripple component is reduced to zero. Further, as a specific constitution for the ripple component detector 61, for example, a band pass filter which detects only frequency components near f0 can be employed. Further, the compensator 62 is a compensating element constituted, for example, by a proportional element and a proportional and integration element.

Figure 4:
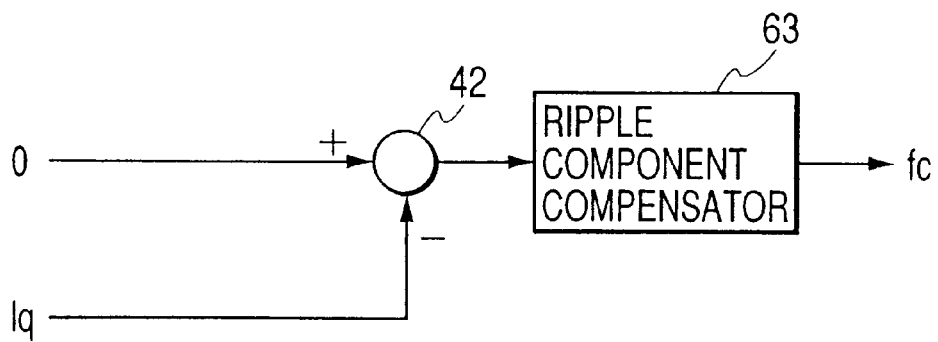
FIG. 4 is another block diagram of the characterizing portion of the present invention for use in the embodiment of FIG. 1.

FIG. 4 shows another example of the inverter compensation frequency generating means 34 in FIG. 1. In the FIG. 4 embodiment, the torque current component Iq is subtracted from the target value 0 in a subtracter 42 and the output of the subtracter 42 is inputted to a ripple component compensator 63. The ripple component compensator 63 is, for example, a compensating element having characteristics represented by a transfer function expressed by the following formula (5). Wherein, Ks is a compensation gain and s is a differential operator.

$$\frac{Ks \cdot s}{s^2 + (2\pi f0)^2} \quad (5)$$

The compensating element expressed by the formula (5) is a compensating element having a high gain only near the frequency f0, and since the frequency component finv0 contained in Iq is a DC component represented by IM×cos(φ−δ), the compensating element can compensate only the component of ripple frequency f0 without affecting the components relating to frequency finv0. For this reason, the FIG. 4 embodiment can achieve substantially the same effect as that of the FIG. 3 compensating element with a reduced number of constitutional elements. Further, since it is satisfactory if the transfer function of the compensating element shows a high gain near the frequency f0, the transfer function is not limited to that expressed by the formula (5), if the transfer function shows a high gain near the ripple frequency f0.

In the embodiments shown in FIGS. 3 and 4, the control is performed by noting the ripple component in the torque current Iq, and the beat phenomenon suppressing control can be performed by noting the ripple component of the exciting current component Id.

Figure 5:
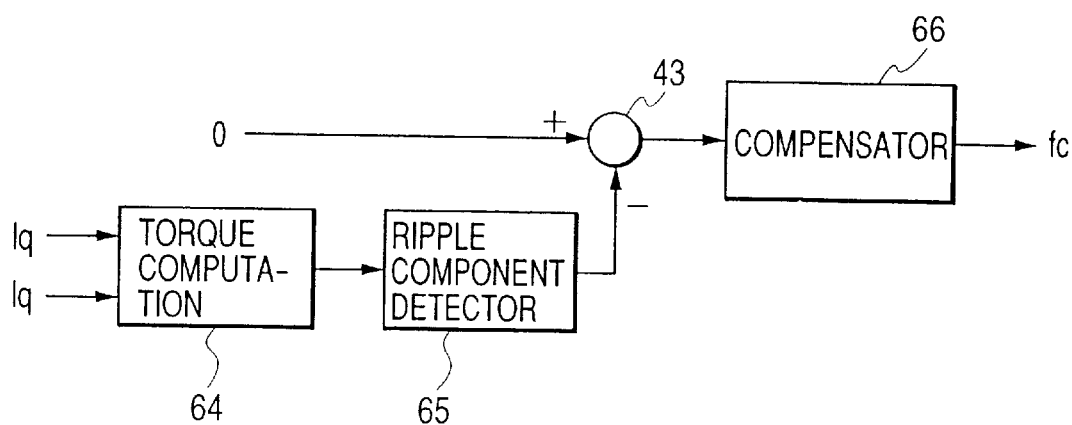
FIG. 5 is still another block diagram of the characterizing portion of the present invention for use in the embodiment of FIG. 1.

FIG. 5 shows still another example of the inverter compensation frequency generating means 34 in FIG. 1. In the FIG. 5 embodiment, Id and Iq which are the outputs from the current vector computing means 21 are inputted in a torque computing means 64, and a torque generated by the motor is computed from Id and Iq (T=K·Id·Iq, wherein K is a constant). From this computed result, a torque ripple is detected by a ripple detector 65, for example, a band pass filter, which passes the frequency component f0 representing the ripple frequency component. The output of the ripple component detector 65 is subtracted from the target value 0 of the torque ripple component in a subtracter 43, and the result of the subtraction is inputted into a compensator 66 for compensating the torque ripple. Herein, the compensator 66 is a compensating system constituted, for example, by a proportional element and an integration element, which outputs an inverter compensation frequency fc so that the input thereto assumes a zero value, namely, the torque ripple is reduced to zero.

Since the torque ripple is the control object of the FIG. 5 embodiment, a further higher motor torque ripple suppressing effect can be obtained.

Figure 6:
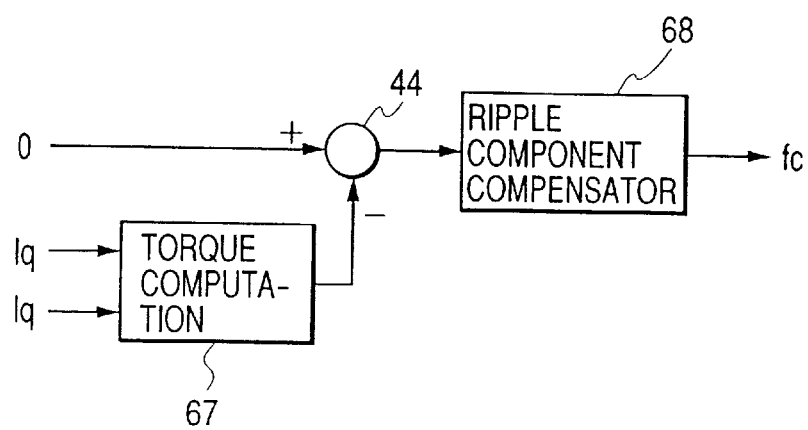
FIG. 6 is a further block diagram of the characterizing portion of the present invention for use in the embodiment in FIG. 1.

FIG. 6 is a further example of the inverter compensation frequency generating means 34 in FIG. 1. In the FIG. 6 embodiment, like the FIG. 5 embodiment, a torque generated by the motor is computed from Id and Iq by the torque computing means 67 and the computed torque is subtracted from the target value 0 in a subtracter 44 (so as to invert the phase of the computed torque), and the subtraction result is inputted to a ripple component compensator 68 with a compensating element having a transfer function, for example, as expressed by the formula (5), like the FIG. 4 embodiment, and in the ripple component compensator 68, only the ripple frequency component is extracted and the extracted component is outputted as the inverter compensation frequency fc. According to the FIG. 6 embodiment, substantially the same effect as that of the FIG. 5 embodiment can be obtained with a reduced number of constitutional elements.

Further, the transfer function is not limited to the function expressed by the formula (5), if the transfer function shows a high gain near the frequency fo.

With regard to the several embodiments of the inverter compensation frequency generating means 34 in the control unit shown in FIG. 1., the advantages according to the present invention will be explained with reference to operational waveforms which have been proved by a simulation using the FIG. 3 embodiment. Preset conditions for the simulation were as follows; the AC motor was a three phase, 100 KW, 4 pole induction motor; the DC voltage for the inverter was 1800V; the ripple voltage and frequency to be superposed on the DC voltage was 100V, 120 Hz; the rotating frequency fr of the motor was 110 Hz; the slip frequency fs was 5 Hz; and the motor current (inverter output current) was 150 A.

Figure 7:
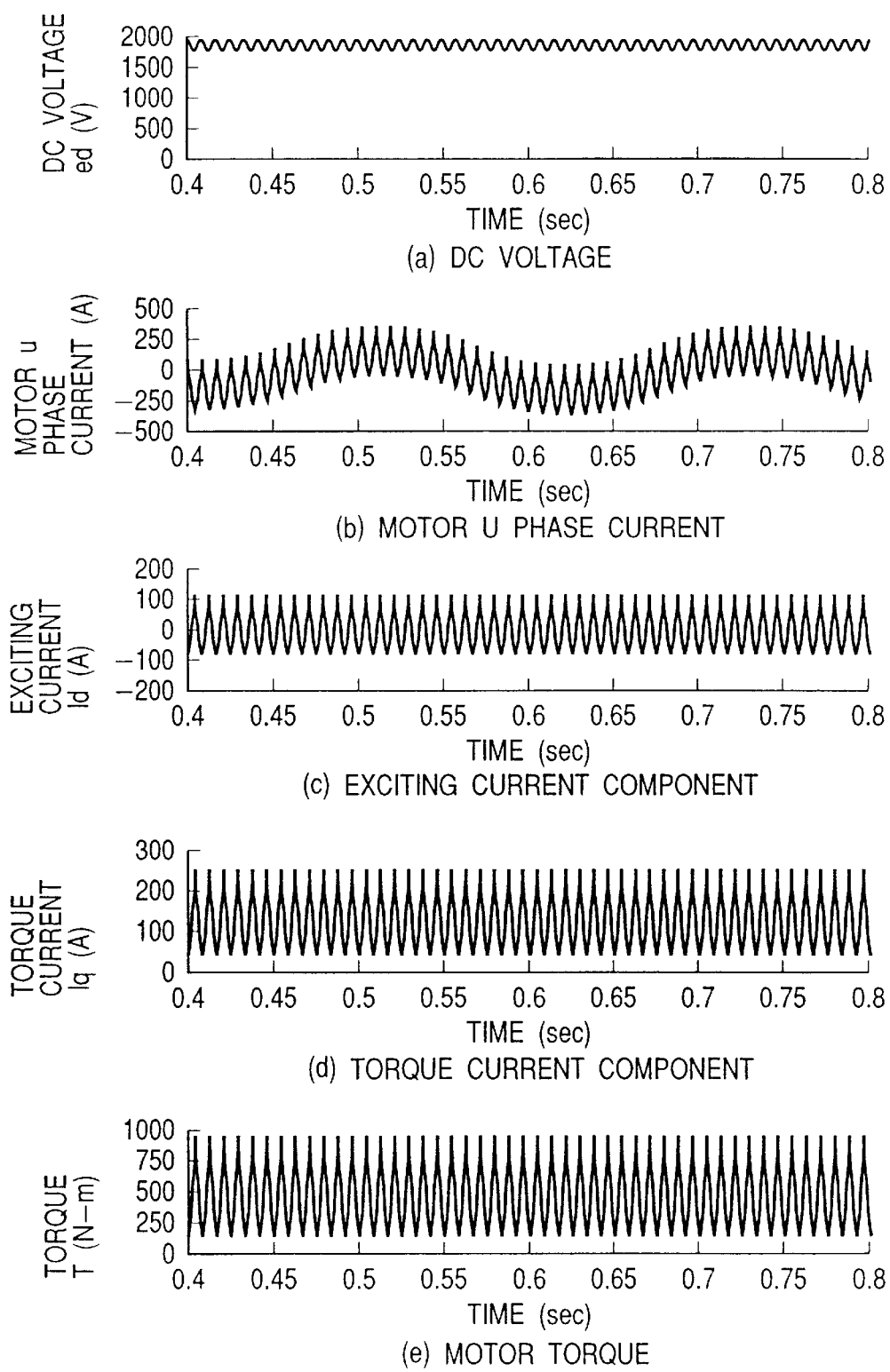
FIGS. 7A through 7E are operating waveform diagrams showing waveforms at a variety of portions in the case of a conventional control method.

FIGS. 7A through 7E show operational waveform diagrams in a conventional control unit in which the inverter compensation frequency generating means 34 in the control unit shown in FIG. 1 was excluded. FIG. 7A shows an inverter input voltage waveform and indicates that in the input there exists a ripple frequency component which is caused when rectifying an AC having a frequency of 60 Hz, suppled from an AC source, using a converter. FIG. 7B shows a waveform of a motor phase current (inverter output current) from which it will be observed that a current component of operating frequency 115 Hz (finv=fr+fs) is superposed on the beat frequency component of frequency 5 Hz (=finv−f0) representing the difference between the operating frequency and the ripple frequency on the DC voltage. With this beat frequency component, the maximum value of the operating frequency component in the motor current is increased by the current component caused by the beat. FIGS. 7C and 7D respectively show an exciting current component and a torque current component which are obtained by performing a coordinate conversion of the motor phase current shown in FIG. 7B into a rotary coordinate system. From FIGS. 7C and 7D it will be observed that a ripple frequency component is superposed on the respective current components. FIG. 7E shows an output torque of the motor, and from which it will be observed that the ripple frequency component is also superposed on the output torque.

Figure 8:
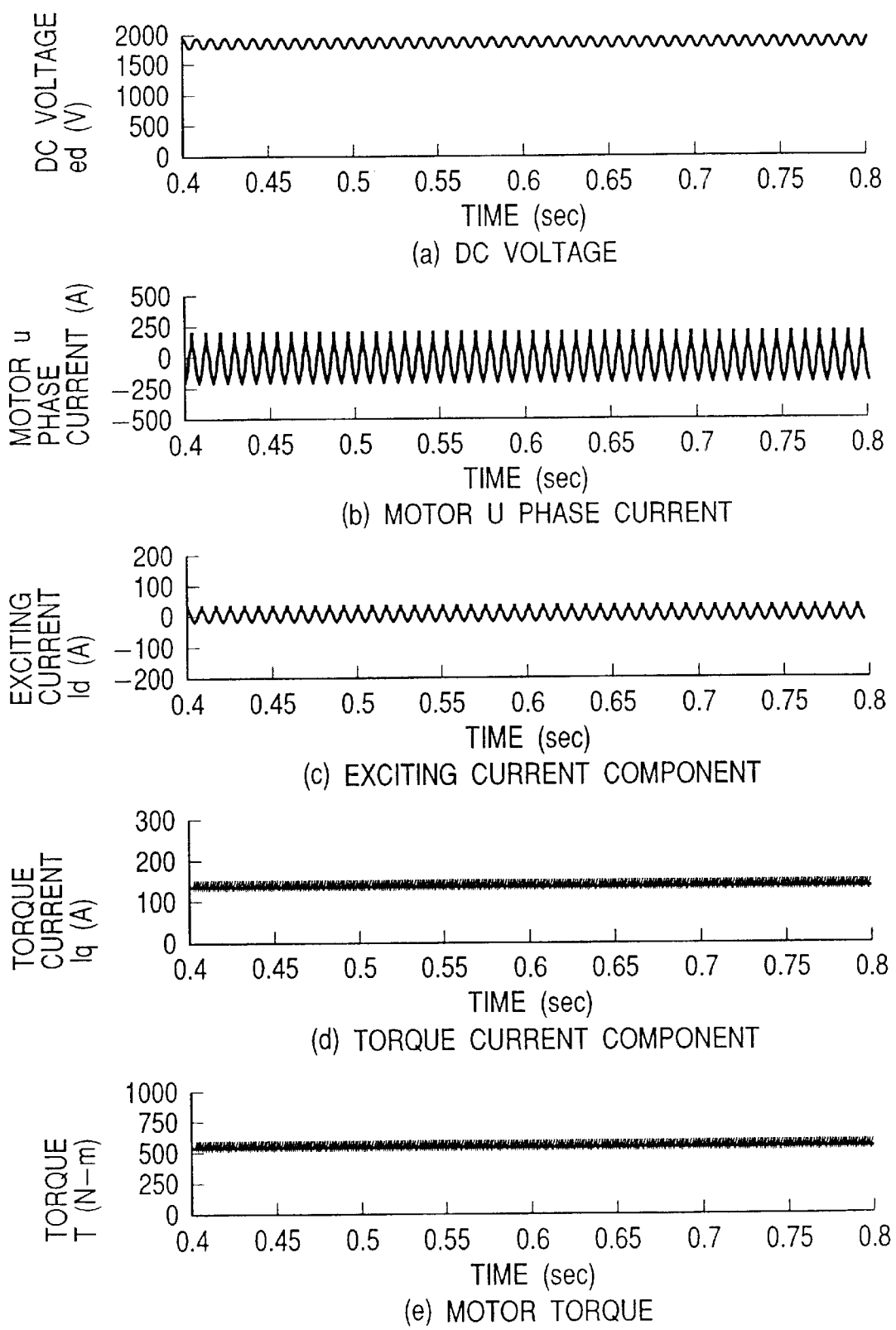
FIGS. 8A through 8E are operating waveform diagrams showing waveforms at a variety of portions when using the control according to the present invention.

FIGS. 8A through 8E show operational waveform diagrams according to the present invention and which correspond to the same events as those of FIGS. 7A through 7E. In spite of the existence of the rectification ripple in the inverter input voltage, as illustrated in FIG. 8A, the motor phase current only contains the operation frequency component, and the beat frequency component caused by the rectification ripple is suppressed, as illustrated in FIG. 8B. As a result, the respective components Id, Iq and T of the exciting current, the torque current and the motor output torque assume DC quantities each having an extremely small ripple component. These DC quantities correspond to the operation frequency components and from such waveforms it will be appreciated that the beat phenomenon caused in association with the rectification ripple is suppressed according to the present invention.

In accordance with the present invention, as has been explained, it is confirmed that by feeding back the detected ripple frequency component contained in the torque current component to the inverter output frequency, the generation of ripple in the motor current and in the torque is suppressed and the generation of the beat phenomenon is suppressed.

Further, since the present invention employs a method of suppressing the beat phenomenon by regulating the inverter input frequency, the beat phenomenon can be suppressed by regulating the inverter frequency in an operating region in which the inverter output voltage constituted by a plurality of pulses can be regulated, as well as in an opera ting region (one pulse mode) in which control of the inverter output voltage is impossible, such as in an electric rolling stock use an inverter in which the width of a pulse included in the inverter output voltage of one cycle is 180° (one pulse).

Figure 9:
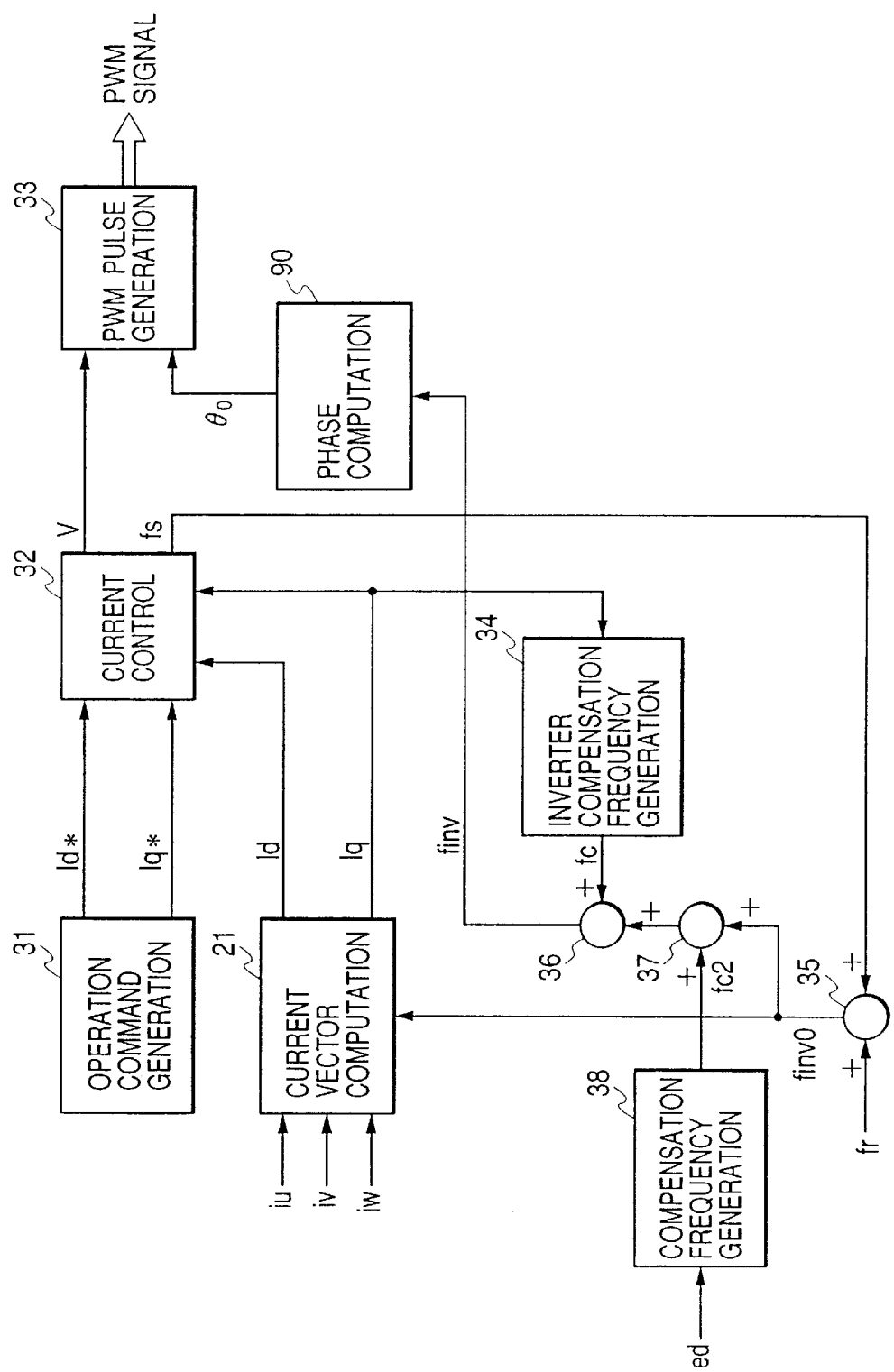
FIG. 9 is a functional block diagram of a control unit for an electric power translating device representing another embodiment according to the present invention.

FIG. 9 is a diagram of a control unit showing another embodiment according to the present invention. In the FIG. 9 embodiment, a compensation frequency generating means 38 which generates a compensation frequency fc2 based on the DC voltage detected by the DC voltage detecting means 141 and an adder 37 in which the output of the compensation frequency generating means 38 and the inverter operating frequency command are added, are further introduced into the FIG. 1 embodiment. Herein, the function of the compensation frequency generating means 38 is to determine a ripple voltage to be superposed on the inverter input DC voltage as a ripple degree for the DC voltage and to output a degree of frequency corresponding to the ripple degree as the compensation frequency fc2, details of which are disclosed in JP-A-64-77492.

Since the FIG. 9 embodiment is constituted to include both a feed forward compensation function in which the ripple component of the DC voltage ed is reflected on the inverter frequency and a feed back compensation function in which the ripple frequency component in the inverter output current is fed back, an even more accurate and stable beat suppressing effect can be obtained.

Figure 10:
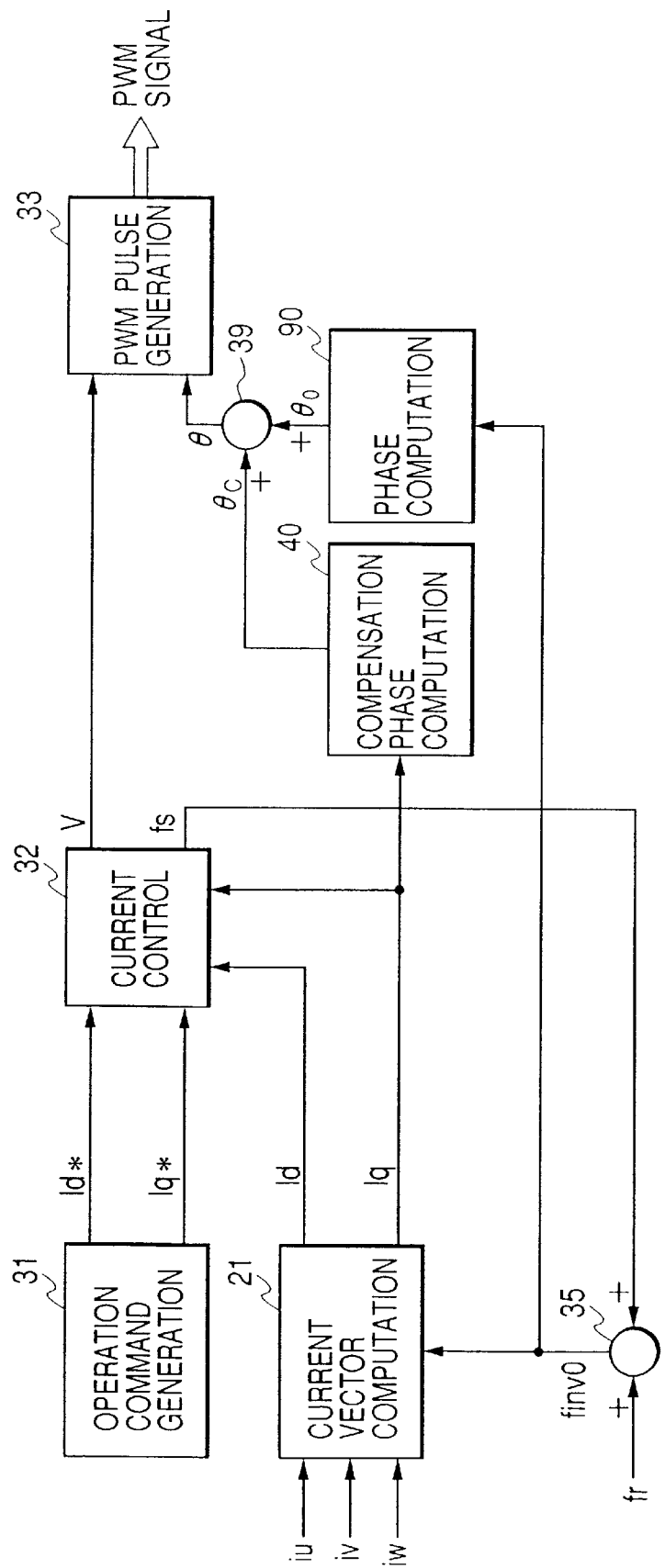
FIG. 10 is a functional block diagram of a control unit for an electric power translating device representing still another embodiment according to the present invention.

FIG. 10 is a diagram of a control unit showing still another embodiment according to the present invention. In contrast to the FIG. 1 embodiment which employs a method of compensating the inverter output frequency, the FIG. 10 embodiment employs a method of directly compensating the inverter phase command, in which an output of a phase computing means 90, which computes an inverter phase θ based on the inverter frequency command finv0 outputted from the adder 35, and an output of a compensation phase computing means 40, which outputs a compensation phase θc based on the ripple frequency component contained in the torque current component Iq, are added in an adder 39. Further, the compensation phase computing means 40 is constituted by any one of the compensation elements shown in FIGS. 3 through 6. The PWM pulse generating means 33 is constituted to generate PWM signals for driving the inverter based on an inverter output voltage effective command V and an inverter output voltage phase command θ.

In the FIG. 10 embodiment, as will be appreciated from the above, the beat phenomenon suppressing effect also can be obtained like the previous embodiments by directly compensating the inverter output phase.

Figure 11:
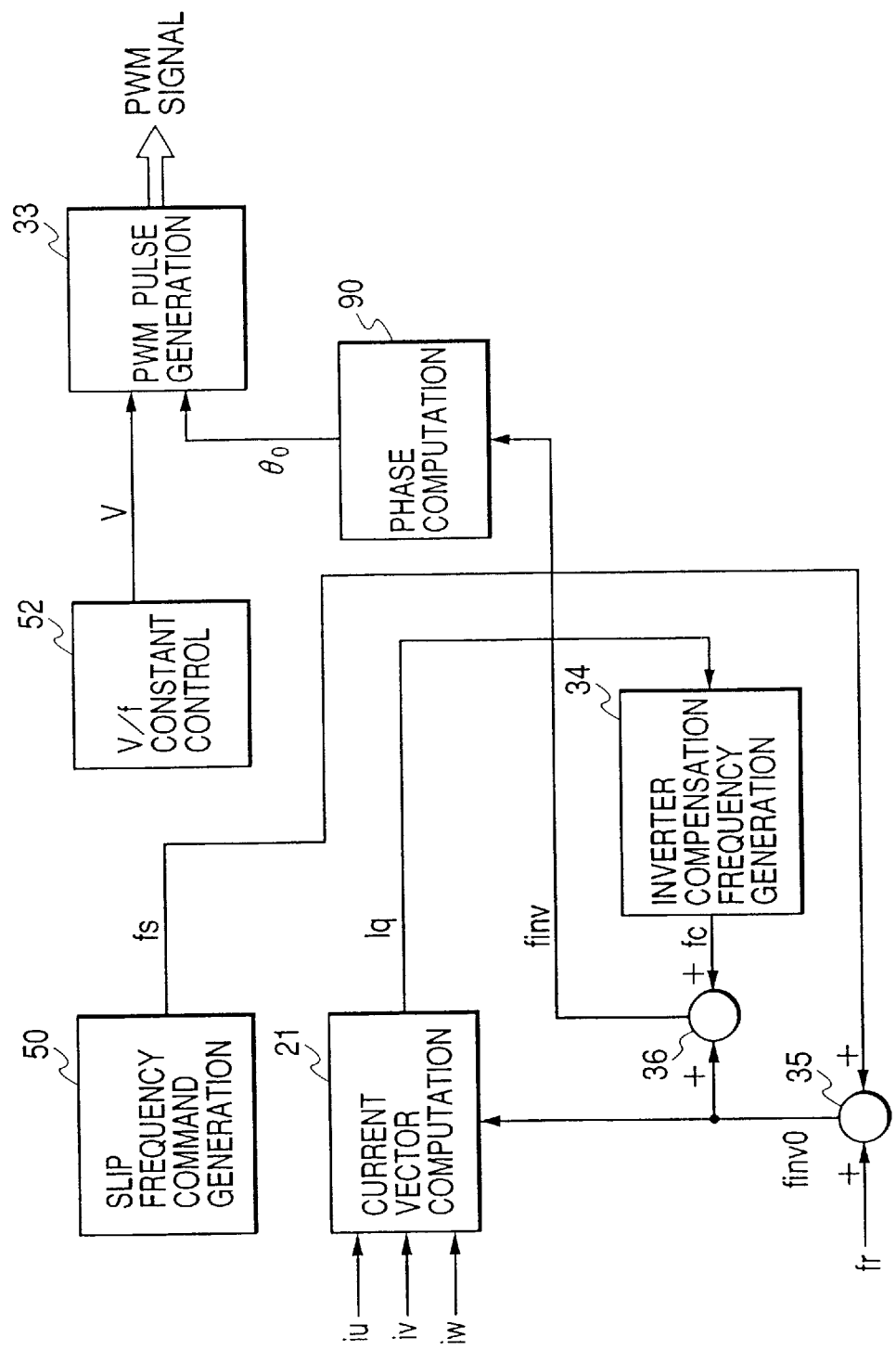
FIG. 11 is a functional block diagram of a control unit for an electric power translating device representing a further embodiment according to the present invention.

In the embodiments according to the present invention as explained hitherto, the control objects are the vector control units, however the control objects of the present invention are not limited to the vector control units. FIG. 11 shows a voltage/frequency constant control unit, namely a V/F control unit, to which the present invention is applied. In the FIG. 11 embodiment, the functions of the elements bearing the same reference numerals as in FIG. 1 are substantially the same as those in FIG. 1, therefore a further explanation thereof will be omitted. Numeral 50 is a slip frequency command generating means, and, in this embodiment, a slip frequency command fs outputted from the slip frequency command generating means 50 is added to the detected motor rotation frequency fr to produce the fundamental wave frequency finv0. In the current vector computing means 21, the motor phase currents iu through iw are subjected to coordinate conversion with reference to the phase of the fundamental wave frequency into a rotary coordinate system to compute the torque current component Iq. Numeral 51 denotes a V/F constant control means which outputs a voltage command proportional to the fundamental wave frequency finv0. Numeral 34 denotes an inverter compensation frequency generating means which generates the inverter compensation frequency fc based on the computed torque current component Iq. The inverter compensation frequency fc and the fundamental wave frequency finv0 are added to produce the inverter operating frequency (output frequency) command finv. Numeral 33 is a PWM pulse generating means which generates PWM signals for performing a well known pulse width modulation control based on the inverter output voltage command V and the phase command θ0. With these PWM signals, the inverter 15 is operated. Herein, the inverter compensation frequency generating means 34 is constituted by any one of the arrangements shown in FIGS. 3 through 6. However, when applying one of the arrangements shown in FIGS. 5 and 6, the exciting current component is also computed by the current vector computing means 21 to allow use of the result thereof.

In the V/F control according to the present embodiment, since no control system is included which controls the exciting current component and the torque current component of the motor so as to assume their target values, the torque current component or the exciting current component computed in the current vector computing means 21 does not correspond to true values. This is because the axis for the computed components is offset from the actual d-q axis of the motor rotary coordinate system. It is reported that this axis offset increases depending on decreases of motor frequency. However, in view of the fact that the frequency band in which the beat phenomenon is caused is near 100 Hz, the axis offset in such region is small; therefore, a possible accuracy reduction in the computed values of Iq and Id is also small.

Accordingly, in the present embodiment, with the addition of the inverter compensation frequency fc, which is superposed on the inverter input DC voltage, to the fundamental wave frequency finv0 only in a region near the ripple frequency caused in association with the rectification, the beat phenomenon suppressing effect to substantially the same level as that obtained by FIG. 1 embodiment is also obtained.

As will be appreciated from the above, one of the characteristics of the present invention is that the present invention is applicable regardless of the inverter control methods which are employed, such as vector control and V/F control.

With regard to the above embodiments according to the present invention, a method of suppressing the beat phenomenon will be explained in which the ripple component in the torque current component Iq, the exciting current component Id or the motor torque T is detected and the detected component is fed back to the inverter output frequency. However, since the instantaneous value of the inverter DC input power, in other words, the product of the instantaneous value of the inverter DC voltage and the instantaneous value of the DC input current is proportionate to the instantaneous value of the motor torque, it will be apparent that the beat phenomenon can also be suppressed if the ripple component in the instantaneous value of the inverter DC input power is detected and is fed back to the inverter output frequency.

Figure 12:
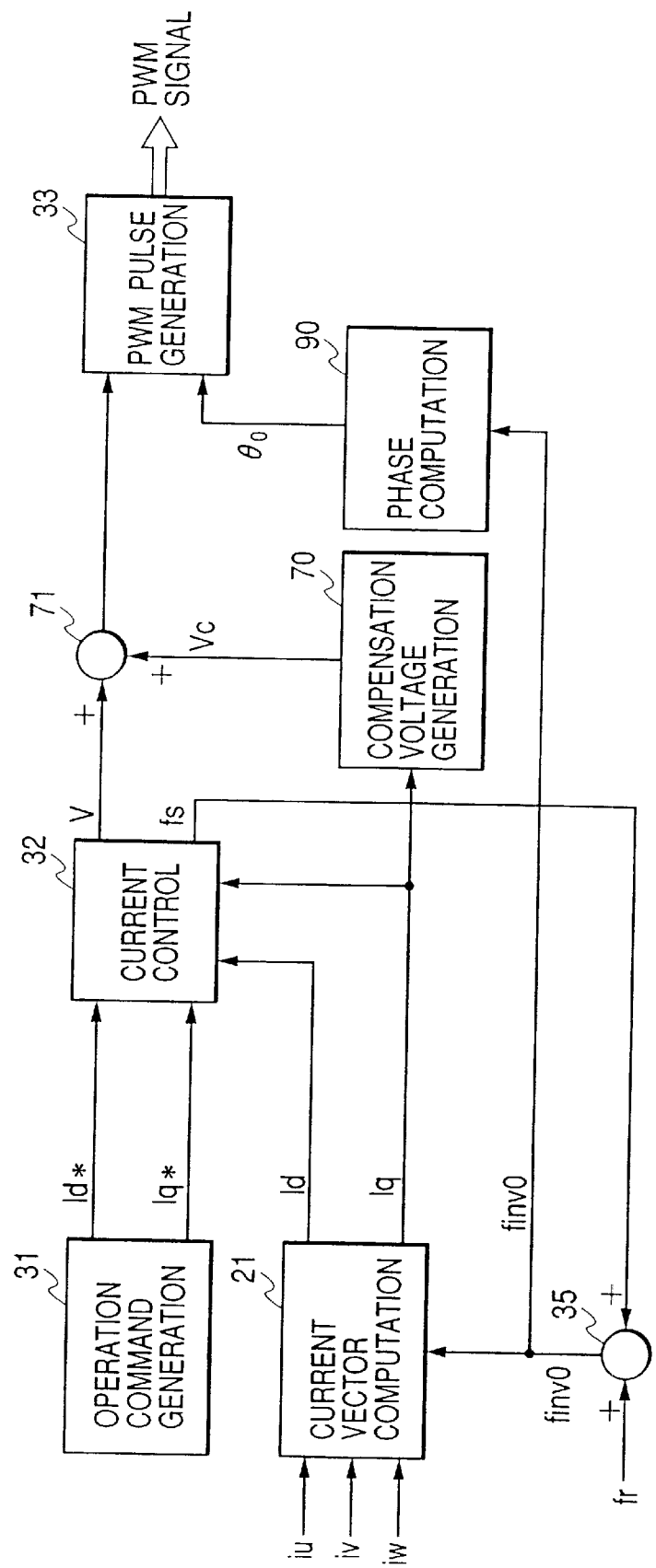
FIG. 12 is a functional block diagram of a control unit for an electric power translating device representing a still further embodiment according to the present invention.

FIG. 12 is a diagram of a control unit showing a still further embodiment according to the present invention. In contrast to the FIG. 1 embodiment, which employs a method of compensating the inverter output frequency based on the ripple frequency component in the torque current component Iq detected by the current vector computing means 21, a method of compensating the inverter output voltage command V is employed. Numeral 70 denotes a compensation voltage generating means which generates a compensation voltage Vc for the inverter output voltage based on the detected torque current component Iq. Numeral 71 denotes an adder in which the compensation voltage Vc is added to the voltage command V produced by the current control means 32 so as to produce an output voltage command. Herein, as the compensation voltage generating means 70, the control circuit as shown in FIG. 3 or FIG. 4 may be employed. For example, when the control circuit as shown in FIG. 3 is used, the component of the ripple frequency f0 contained in the torque current component Iq is detected by the ripple component detection circuit 61 and a compensator 62, including compensation elements such as proportional and integration elements, which outputs a compensation voltage Vc so that the component of f0 assumes the zero value.

According to the present embodiment, substantially the same effect as that of the FIG. 1 embodiment can be obtained in a non-saturation region of the inverter output voltage.

Figure 13:
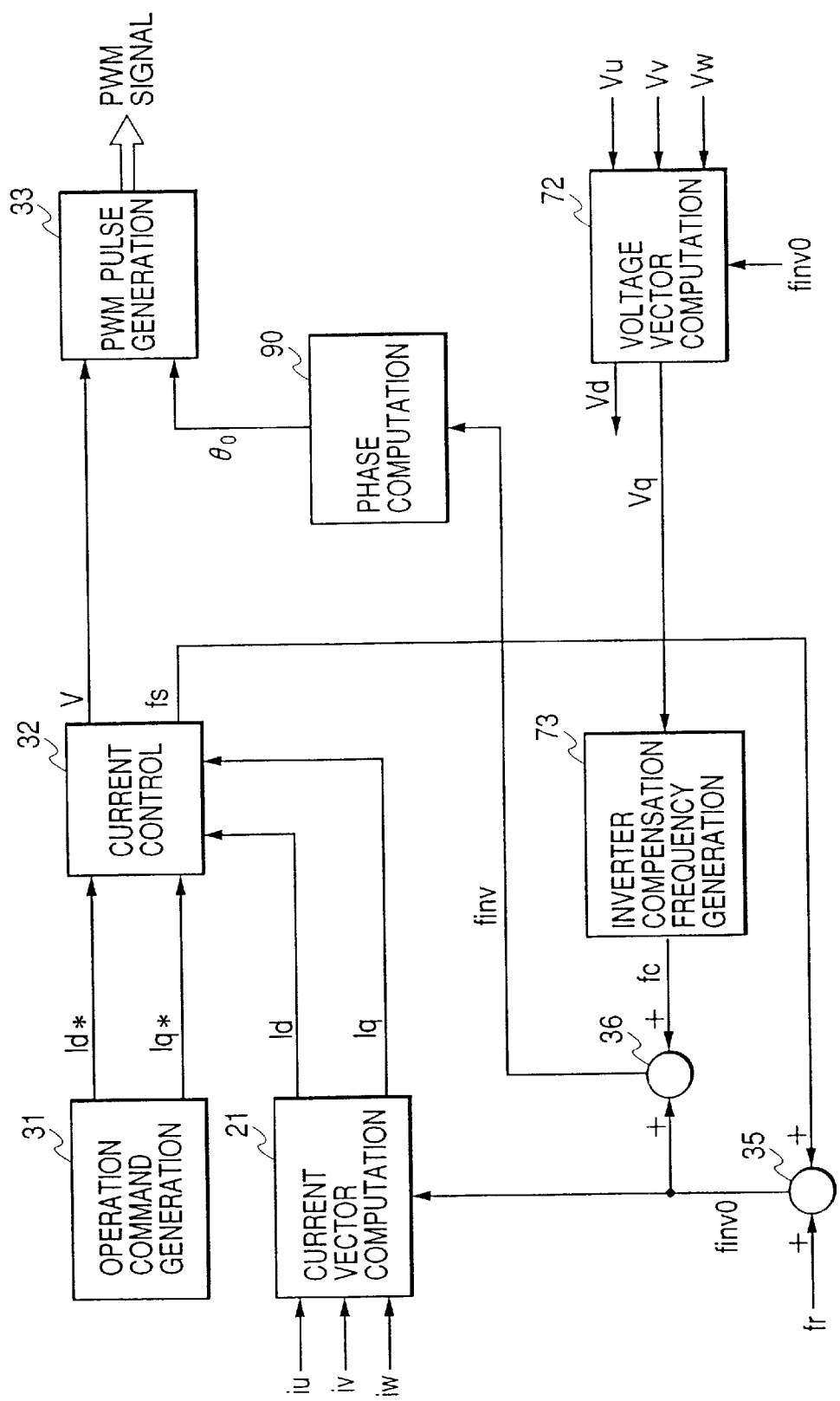
FIG. 13 is a functional block diagram of a control unit for an electric power translating device representing a still further embodiment according to the present invention.

FIG. 13 is a diagram of a control unit showing a still further embodiment according to the present invention. In contrast to the FIG. 1 embodiment, in the FIG. 13 embodiment, the frequency is compensated by the inverter output voltage. Numeral 72 denotes a voltage vector computing means in which the respective detected inverter phase instantaneous output voltages Vu through Vw are subjected to a coordinate conversion into a rotary coordinate system and the voltage components Vd and Vq are computed on two orthogonal axes. At least one of the thus obtained voltage components (in the FIG. 13 embodiment, Vq) is inputted in an inverter compensation frequency generating means 73 from which a compensation frequency fc for compensating the ripple frequency component is generated, and the generated compensation frequency fc is added to the inverter operating frequency finv0.

Herein, as the inverter compensation frequency generating means 73, the control circuit as shown in FIG. 3 or FIG. 4 may be employed. For example, when the control circuit shown in FIG. 3 is used, the component of ripple frequency f0 contained in the torque voltage component Vq is detected by the ripple component detection circuit 61 and a compensator 62 including compensation elements, such as proportional and integration elements, outputs a compensation frequency fc so that the component of f0 assumes the zero value.

According to the present embodiment, it is required to provide a detector to detect the inverter output voltage and a voltage vector computing means specially for compensating the ripple frequency component in comparison with the FIG. 1 embodiment. However, since the compensation is effected by directly detecting a voltage unbalance in both positive and negative polarity sides of the inverter output voltage, which causes the beat phenomenon, an advantage of an excellent compensation accuracy and response characteristics is obtained.

Further, in the FIG. 13 embodiment, the frequency is compensated based on the ripple frequency component in the torque voltage component Vq. However, instead of frequency compensation, the phase θ0 can also be compensated.

Figure 14:
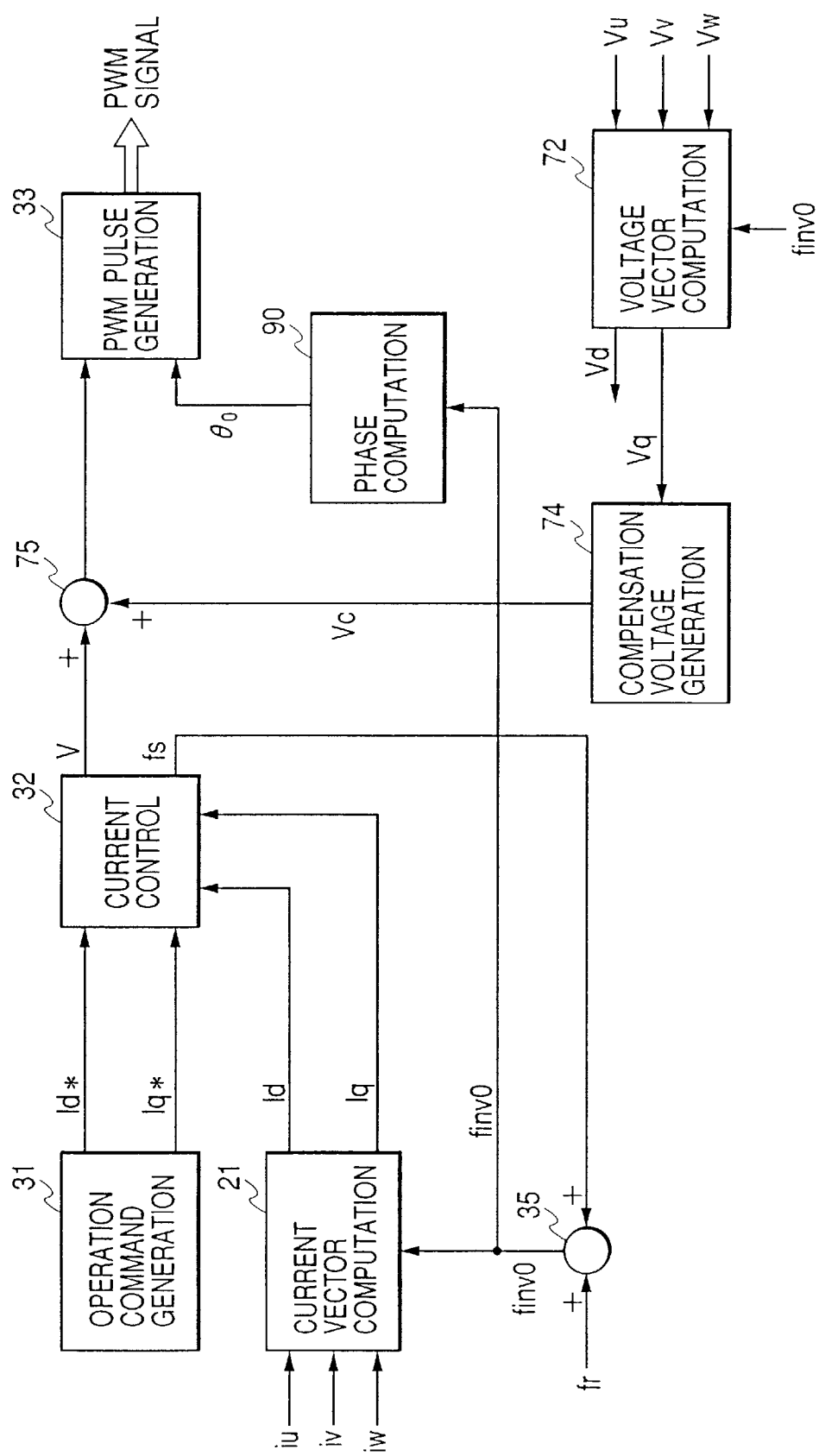
FIG. 14 is a functional block diagram of a control unit for an electric power translating device representing a still further embodiment according to the present invention.

FIG. 14 is a diagram of a control unit showing a still further embodiment according to the present invention. In contrast to the FIG. 13 embodiment, which employs method of compensating the inverter output frequency based on the ripple frequency component in the torque voltage component Vq, the FIG. 14 embodiment employs a method of compensating the inverter output voltage command V. Numeral 74 denotes a compensation voltage generating means which generates the compensation voltage Vc for the inverter output voltage based on the detected torque voltage component Vq. Numeral 75 denotes an adder in which the compensation voltage Vc is added to the voltage command V produced by the current control means 32 to output the output voltage command. Herein, as the compensation voltage generating means 74 the control circuit shown in FIG. 3 or FIG. 4 may be employed. For example, when the control circuit as shown in FIG. 3 is applied, the component of the ripple frequency f0 contained in the torque voltage component Vq is detected by the ripple component detection circuit 61 and a compensator 62 including compensation elements, such as proportional and integration elements, outputs a compensation voltage Vc so that the component of f0 assumes the zero value.

According to the present embodiment, substantially the same effect as that of the 13 embodiment can be obtained in a non-saturation region of the inverter output voltage.

According to the present invention, by detecting a ripple in the AC motor current caused by a rectification ripple of the inverter input voltage as a current component in a rotary coordinate system, only the component caused by the rectification ripple is taken out precisely and the removed component is used for feed back compensation; therefore, even when the operating frequency of the inverter and the motor output vary, for example, the beat phenomenon due to the ripple component contained in the inverter input voltage can be suppressed without requiring a complex gain adjustment and phase adjustment. Further, with the above measure, the beat phenomenon is suppressed even when a ripple exists in the inverter input DC voltage, thereby, an advantage that the capacity of a smoothing capacitor in the device can be reduced.

Accordingly, the present invention is directed to an inverter for driving an AC motor with a variable speed using DC power which is obtained by rectifying AC power using a converter, which is particularly useful for an electric rolling stock for a single phase AC driven railway, which tends to increase the rectification ripple, as well as being suitable for home electric appliances in which a motor is controlled by an inverter, such as an air conditioner, a refrigerator and a washing machine.

What is claimed is:

1. An electric power translating device comprising:
   a converter for converting an AC source voltage into a DC voltage through rectification;
   a smoothing capacitor connected at the DC side of the converter;
   an inverter for inverting the DC voltage across the smoothing capacitor into an AC and for supplying the AC to an AC motor; and
   means for controlling the AC output from the inverter, which controls the AC output of the inverter based on a ripple frequency component contained in the AC output of the inverter and related to the rectification by the converter.

2. The electric power translating device according to claim 1 further comprising means for controlling the AC output from the inverter, which controls voltage in the AC output of the inverter based on a ripple frequency component contained in the AC output of the inverter and related to the rectification by the converter.

3. The electric power translating device according to claim 1 further comprising means for controlling the AC output from the inverter, which controls frequency in the AC output of the inverter based on a ripple frequency component contained in the AC output of the inverter and related to the rectification by the converter.

4. The electric power translating device according to claim 1 further comprising means for controlling the AC output from the inverter, which controls phase in the AC output of the inverter based on a ripple frequency component contained in the AC output of the inverter and relating to the rectification by the converter.

5. An electric power translating device comprising:
   a converter for converting an AC source voltage into a DC voltage through rectification;
   a smoothing capacitor connected at the DC side of the converter;
   an inverter for inverting the DC voltage across the smoothing capacitor into an AC and for supplying the AC to an AC motor; and
   means for controlling the AC output from the inverter, which extracts a ripple frequency component contained in the AC output of the inverter and related to the rectification by the converter and controls the AC output of the inverter based on the extracted ripple frequency component.

6. The electric power translating device according to claim 5 further comprising means for controlling the AC output from the inverter, which extracts a ripple frequency component contained in the AC output of the inverter and relating to the rectification by the converter and controls voltage in the AC output of the inverter based on the extracted ripple frequency component.

7. The electric power translating device according to claim 5 further comprising means for controlling the AC output from the inverter, which extracts a ripple frequency component contained in the AC output of the inverter and related to the rectification by the converter and controls frequency in the AC output of the inverter based on the extracted ripple frequency component.

8. The electric power translating device according to claim 5 further comprising means for controlling the AC output from the inverter, which extracts a ripple frequency component contained in the AC output of the inverter and related to the rectification by the converter and controls phase in the AC output of the inverter based on the extracted ripple frequency component.

9. An electric power translating device comprising:
   a converter for converting an AC source voltage into a DC voltage through rectification;
   a smoothing capacitor connected at the DC side of the converter;
   an inverter for inverting the DC voltage across the smoothing capacitor into an AC and for supplying the AC to an AC motor; and
   means for controlling the AC output from the inverter, which controls the AC output of the inverter based on a ripple frequency component contained in the AC output of the inverter and related to the rectification by the converter,
   wherein said control means controls the AC output from the inverter in a direction of suppressing beat phenomenon caused by the rectification ripple.

10. The electric power translating device according to claim 9 further comprising means for controlling the AC output from the inverter, which controls voltage in the AC output of the inverter based on a ripple frequency component contained in the AC output of the inverter and related to the rectification by the converter, wherein said control means controls the voltage in the AC output from the inverter in a direction of suppressing beat phenomenon caused by the rectification ripple.

11. The electric power translating device according to claim 9 further comprising means for controlling the AC output from the inverter, which controls frequency in the AC output of the inverter based on a ripple frequency component contained in the AC output of the inverter and related to the rectification by the converter, wherein said control means controls the frequency in the AC output from the inverter in a direction of suppressing beat phenomenon caused by the rectification ripple.

12. The electric power translating device according to claim 9 further comprising means for controlling the AC output from the inverter, which controls phase in the AC output of the inverter based on a ripple frequency component contained in the AC output of the inverter and related to the rectification by the converter, wherein said control means controls the phase in the AC output from the inverter in a direction of suppressing beat phenomenon caused by the rectification ripple.

13. An electric power translating device comprising:
   a converter for converting an AC source voltage into a DC voltage through rectification;
   a smoothing capacitor connected at the DC side of the converter;
   an inverter for inverting the DC voltage across the smoothing capacitor into an AC and for supplying the AC to an AC motor; and
   means for controlling the AC output from the inverter which extracts a ripple frequency component contained in the AC output of the inverter and relating to the rectification by the converter and controls the AC output of the inverter base and the extracted ripple frequency component,
   wherein said control means controls the AC output from the inverter in a direction of suppressing beat phenomenon caused by the rectification ripple.

14. The electric power translating device according to claim 13 further comprising means for controlling the AC output from the inverter, which extracts a ripple frequency component contained in the AC output of the inverter and related to the rectification by the converter and controls voltage in the AC output of the inverter based on the extracted ripple frequency component, wherein said control means controls the voltage in the AC output from the inverter in a direction of suppressing beat phenomenon caused by the rectification ripple.

15. The electric power translating device according to claim 13 further comprising means for controlling the AC output from the inverter, which extracts a ripple frequency component contained in the AC output of the inverter and related to the rectification by the converter and controls frequency in the AC output of the inverter based on the extracted ripple frequency component, wherein said control means controls the frequency in the AC output from the inverter in a direction of suppressing beat phenomenon caused by the rectification ripple.

16. The electric power translating device according to claim 13 further comprising means for controlling the AC output from the inverter, which extracts a ripple frequency component contained in the AC output of the inverter and related to the rectification by the converter and controls phase in the AC output of the inverter based on the extracted ripple frequency component, wherein said control means controls the phase in the AC output from the inverter in a direction of suppressing beat phenomenon caused by the rectification ripple.

17. An electric power translating device comprising:
- a converter for converting a single phase AC source voltage into a DC voltage through rectification;
- a smoothing capacitor connected at the DC side of the converter;
- an inverter for inverting the DC voltage across the smoothing capacitor into a three phase AC and for supplying the three phase AC to a three phase AC motor; and
- means for controlling the three phase AC output from the inverter, which controls the three phase AC output of the inverter based on a ripple frequency component contained in the three phase AC output of the inverter and related to the rectification by the converter.

18. The electric power translating device according to claim 17 further comprising means for controlling the three phase AC output from the inverter, which controls voltage in the three phase AC output of the inverter based on a ripple frequency component contained in the three phase AC output of the inverter and related to the rectification by the converter.

19. The electric power translating device according to claim 17 further comprising means for controlling the AC output from the inverter, which controls frequency in the three phase AC output of the inverter based on a ripple frequency component contained in the three phase AC output of the inverter and related to the rectification by the converter.

20. The electric power translating device according to claim 17 further comprising means for controlling the three phase AC output from the inverter, which controls phase in the three phase AC output of the inverter based on a ripple frequency component contained in the three phase AC output of the inverter and related to the rectification by the converter.

21. An electric power translating device comprising:
- a converter for converting a single phase AC source voltage into a DC voltage through rectification;
- a smoothing capacitor connected at the DC side of the converter;
- an inverter for inverting the DC voltage across the smoothing capacitor into a three phase AC and for supplying the three phase AC to a three phase AC motor; and
- means for controlling the three phase AC output from the inverter, which extracts a ripple frequency component contained in the three phase AC output of the inverter and related to the rectification by the converter and controls the three phase AC output of the inverter based on the extracted ripple frequency component.

22. The electric power translating device according to claim 21 further comprising means for controlling the three phase AC output from the inverter, which extracts a ripple frequency component contained in the three phase AC output of the inverter and related to the rectification by the converter and controls voltage in the three phase AC output of the inverter based on the extracted ripple frequency component.

23. The electric power translating device according to claim 21 further comprising means for controlling the three phase AC output from the inverter, which extracts a ripple frequency component contained in the three phase AC output of the inverter and related to the rectification by the converter and controls frequency in the three phase AC output of the inverter based on the extracted ripple frequency component.

24. The electric power translating device according to claim 21 further comprising means for controlling the three phase AC output from the inverter, which extracts a ripple frequency component contained in the three phase AC output of the inverter and related to the rectification by the converter and controls phase in the three phase AC output of the inverter based on the extracted ripple frequency component.

25. An electric power translating device comprising:
- a converter for converting a single phase AC source voltage into a DC voltage through rectification;
- a smoothing capacitor connected at the DC side of the converter;
- an inverter for inverting the DC voltage across the smoothing capacitor into a three phase AC and for supplying the three phase AC to a three phase AC motor; and
- means for controlling the three phase AC output from the inverter; which controls the three phase AC output of the inverter based on a ripple frequency component contained in the three phase AC output of the inverter and related to the rectification by the converter,
- wherein said control means controls the three phase AC output from the inverter in a direction of suppressing beat phenomenon caused by the rectification ripple.

26. The electric power translating device according to claim 25 further comprising means for controlling the three phase AC output from the inverter, which controls voltage in the AC output of the inverter based on a ripple frequency component contained in the three phase AC output of the inverter and related to the rectification by the converter, wherein said control means controls the voltage in the three phase AC output from the inverter in a direction of suppressing beat phenomenon caused by the rectification ripple.

27. The electric power translating device according to claim 25 further comprising means for controlling the three phase AC output from the inverter, which controls frequency in the three phase AC output of the inverter based on a ripple frequency component contained in the three phase AC output of the inverter and related to the rectification by the converter, wherein said control means controls the frequency in the three phase AC output from the inverter in a direction of suppressing beat phenomenon caused by the rectification ripple.

28. The electric power translating device according to claim 25 further comprising means for controlling the three phase AC output from the inverter, which controls phase in the three phase AC output of the inverter based on a ripple frequency component contained in the three phase AC output of the inverter and related to the rectification by the converter, wherein said control means controls the phase in the three phase AC output from the inverter in a direction of suppressing beat phenomenon caused by the rectification ripple.

29. An electric power translating device comprising:
- a converter for converting a single phase AC source voltage into a DC voltage through rectification;
- a smoothing capacitor connected at the DC side of the converter;
- an inverter for inverting the DC voltage across the smoothing capacitor into a three phase AC and for supplying the three phase AC to a three phase AC motor; and means for controlling the three phase AC output from the inverter, which extracts a ripple frequency component contained in the three phase AC output of the inverter and related to the rectification by the converter and controls the three phase AC output of the inverter based on the extracted ripple frequency component, wherein said control means controls the three phase AC output from the inverter in a direction of suppressing beat phenomenon caused by the rectification ripple.

30. The electric power translating device according to claim 29 further comprising means for controlling the three phase AC output from the inverter, which extracts a ripple frequency component contained in the three phase AC output of the inverter and related to the rectification by the converter and controls voltage in the three phase AC output of the inverter based on the extracted ripple frequency component, wherein said control means controls the voltage in the three phase AC output from the inverter in a direction of suppressing beat phenomenon caused by the rectification ripple.

31. The electric power translating device according to claim 29 further comprising means for controlling the three phase AC output from the inverter, which extracts a ripple frequency component contained in the three phase AC output of the inverter and related to the rectification by the converter and controls frequency in the three phase AC output of the inverter based on the extracted ripple frequency component, wherein said control means controls the frequency in the three phase AC output from the inverter in a direction of suppressing beat phenomenon caused by the rectification ripple.

32. The electric power translating device according to claim 29 further comprising means for controlling the three phase AC output from the inverter, which extracts a ripple frequency component contained in the three phase AC output of the inverter and related to the rectification by the converter and controls phase in the three phase AC output of the inverter based on the extracted ripple frequency component, wherein said control means controls the phase in the three phase AC output from the inverter in a direction of suppressing beat phenomenon caused by the rectification ripple.

* * * * *